United States Patent [19]
Bitterlich et al.

[11] Patent Number: 5,809,660
[45] Date of Patent: Sep. 22, 1998

[54] TREE-TRUNK-DIAMETER GAUGE

[75] Inventors: Walter Bitterlich; Benno Hesske; Gerlinde Ruthner, all of Salzburg, Austria

[73] Assignee: Feinmechanische Optische Betriebsgesellschaft mbH, Salzburg, Austria

[21] Appl. No.: 827,737

[22] Filed: Apr. 10, 1997

[30] Foreign Application Priority Data

Apr. 16, 1996 [AT] Austria ................................. A 685/96
Jun. 14, 1996 [AT] Austria ............................... A 1045/96
Jan. 14, 1997 [AT] Austria .................................. A 47/97

[51] Int. Cl.⁶ ............................. G01B 3/38; G01B 3/10
[52] U.S. Cl. ..................... 33/555.1; 33/555.3; 33/555.4; 33/679.1
[58] Field of Search ............................... 33/555.1, 555.3, 33/555.4, 783, 784, 679.1

[56] References Cited

U.S. PATENT DOCUMENTS

| 911,729 | 2/1909 | Jones | 33/679.1 |
|---|---|---|---|
| 1,385,139 | 7/1921 | MacDougal | 33/679.1 |
| 5,167,073 | 12/1992 | Stein | 33/645 |

*Primary Examiner*—Christopher W. Fulton
*Attorney, Agent, or Firm*—Herbert Dubno

[57] ABSTRACT

A tree-trunk-diameter gauge has an adjustment which enables, by a simple multiplication factor of the scale indication, the use of the gauge for a range of larger diameter trees in addition to a range of smaller diameter trees. The gauge can be mounted by holes in the gauge body and an elastic band or by a hook and loop fastener to the back of the hand of the user.

13 Claims, 12 Drawing Sheets

$h = r(1-\cos 22.5) = 7.61\%$ von r
order $3.81\%$ von d

TREE-TRUNK-DIAMETER GAUGE

FIELD OF THE INVENTION

Our present invention relates to a tree-trunk-diameter gauge and, more particularly, to a gauge for measuring the diameters of tree trunks and which can be held on the back of the hand of a user and is suitable for determining the diameters of a wide range of tree trunks.

BACKGROUND OF THE INVENTION

Gauges for determining the diameter of a tree trunk are described, for example, in Austrian patent 172,607 and German patent 908,416, both from 1952 and which are in the form of angles which can be held against a tree trunk and can indicate directly the trunk diameter utilizing an indicating pin which is sited across the scale toward a side of the tree trunk. This device has the advantage that it does not require complex mechanical manipulation of parts thereof to obtain a measurement and can be held by only one hand of the user. It has been found that the use of such a gauge enables even large diameter tree trunks to be measured where parallel-jaw calipers could not be used. However, for the measurement of larger trees, the gauge had to be originally fabricated to be twice as large.

Furthermore, it is often desired with such gauges to establish a fixed distance of the indicator needle from the eyes of the user, i.e. to ensure reproducible measurements, and that could not be achieved with earlier devices of the type described.

Finally it has been found that measurements should be taken on trees with a certain spatial orientation and that has also been difficult with conventional devices.

OBJECTS OF THE INVENTION

It is, therefore, the principal object of the present invention to provide a light-weight gauge which, while suitable for measurement of tree diameters up to say 100 cm can also be used to measure trunk diameters which can be significantly larger, say twice as large, without difficulty and while nevertheless retaining the hand of the user as free as possible for other purposes.

Another object of this invention is to provide an improved tree diameter gauge which facilitates specific orientation of the gauge on the tree in space so that it is not necessary, for example, to first determine directions in space before a measurement is to be carried out.

It is also an object of the invention to provide an improved device for angle count sampling which ensures high reproducibility of results by establishing a fixed distance of the user's eyes from the gauge.

SUMMARY OF THE INVENTION

These objects and others which will become apparent hereinafter are attained, in accordance with the invention, in a gauge which can be mounted on the back of one hand of a user in such manner that the fingers of the user remain free for operating a tree marking device, a calculator, or for any other purpose and wherein the gauge may be used for trees of diameters up to say 100 cm, i.e. trees of a lower diameter range, but wherein the device is readily adaptable by the releasable attachment of a fixture or further body thereto, for the measurement of a larger range of tree diameters.

In practice, this can be accomplished by providing the angle body of the gauge with three holes, through two of which an elastic band can be passed to attach the gauge to the back of the hand of the user, the holes serving in addition for connection to the attachment to the basic gauge body. The underside of the gauge can, if desired, be provided with a recess in which a hook and loop fastener may be adhesively secured to serve as an attachment to the back of the hand of the user. The arcuate scale which is provided according to the invention can be provided with a band of a width which is so determined based upon the center-to-center spacing of the individual viewer's eyes, that each eye images the indicator pin or needle at a respective end of that band when the gauge is held at a fixed distance from the eyes of the user, say a distance from the eyes of the user to the indicator needle of three times the distance from the needle to the scale which is centered on the needle.

Since the user can readily establish the eye distance by holding up the gauge and matching the images of the left and right eye with the right and left edges of the band, the gauge offers reproducibility.

The orientation in space of the gauge can be established according to the invention by providing a magnetic compass, i.e. a compass whose magnetic needle indicates north and south directly on the body of the gauge.

The tree-trunk-diameter gauge of the invention can thus comprise:

- a rigid angle body formed with a first shank and a second shank adjoining the first shank at a vertex of the body;
- an arm pivotably mounted on the second shank proximal to the vertex between a compact position wherein the arm lies along the second shank and a working position wherein the arm extends from the vertex, whereby the arm and the first shank engage spaced apart locations on a tree trunk;
- an arcuate scale on an inner side of the first shank convexly facing toward an end of the second shank remote from the vertex;
- means at the end cooperating with the scale and positionable in line with a side of the tree trunk for indicating on the scale a diameter of the tree trunk; and
- an attachment connectable with the body and dimensioned to contact tree trunks of larger trees while enabling the indicator means to indicate the diameters thereof on the scale upon application of a multiplication factor.

Preferably the attachment comprises a further rigid angle body formed with a respective first shank and a respective second shank adjoining the first shank of the further body at a respective vertex thereof, and a further arm pivotably mounted on the second shank of the further body proximal to the vertex of the further body for swinging movement between a compact position wherein the further arm lies along the second shank of the further body and a working position wherein the further arm extends from the vertex of the further body, the further body having means for connecting the further body to the first shank of the first-mentioned body.

Advantageously corresponding points on the further body are twice the distance from the indicator means than respective points of the first-mentioned body and the multiplication factor is two.

A segment method of measuring diameter and which can utilize the compass on the gauge body has been described in Austrian patent 400,765.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
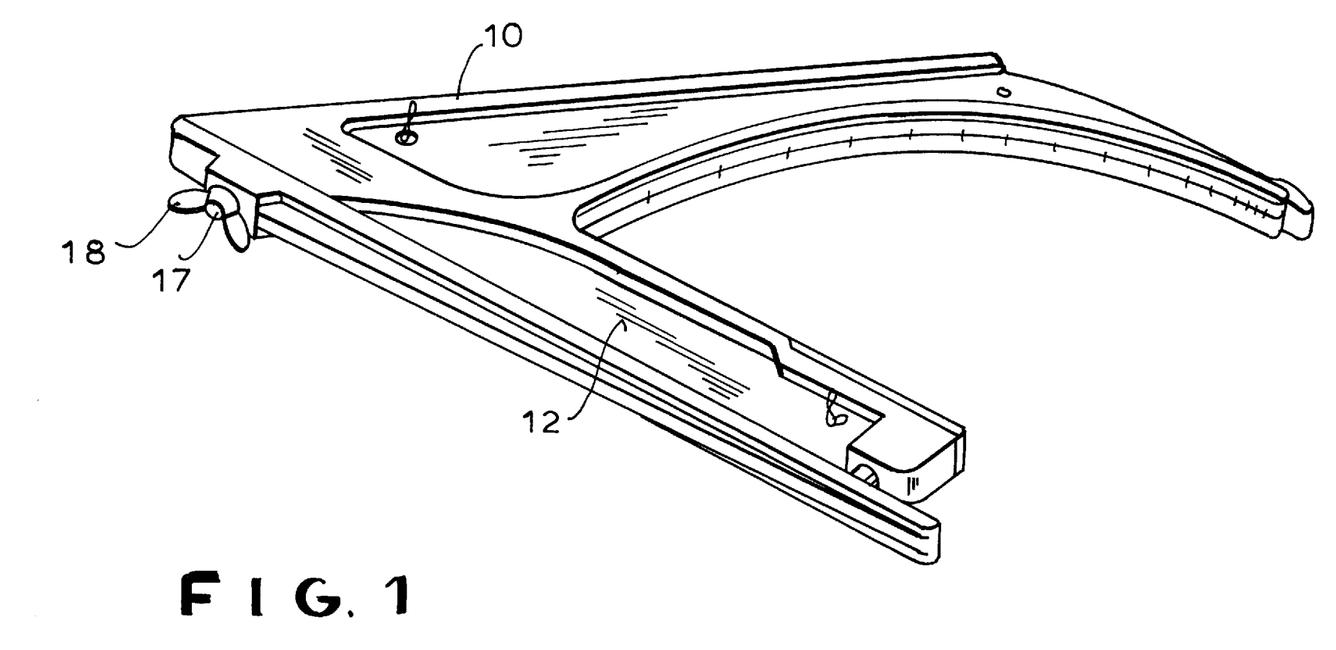
FIG. 1 is a perspective view of a tree diameter gauge in accordance with the present invention with its swingable bar in its nonextended position.
Figure 2:
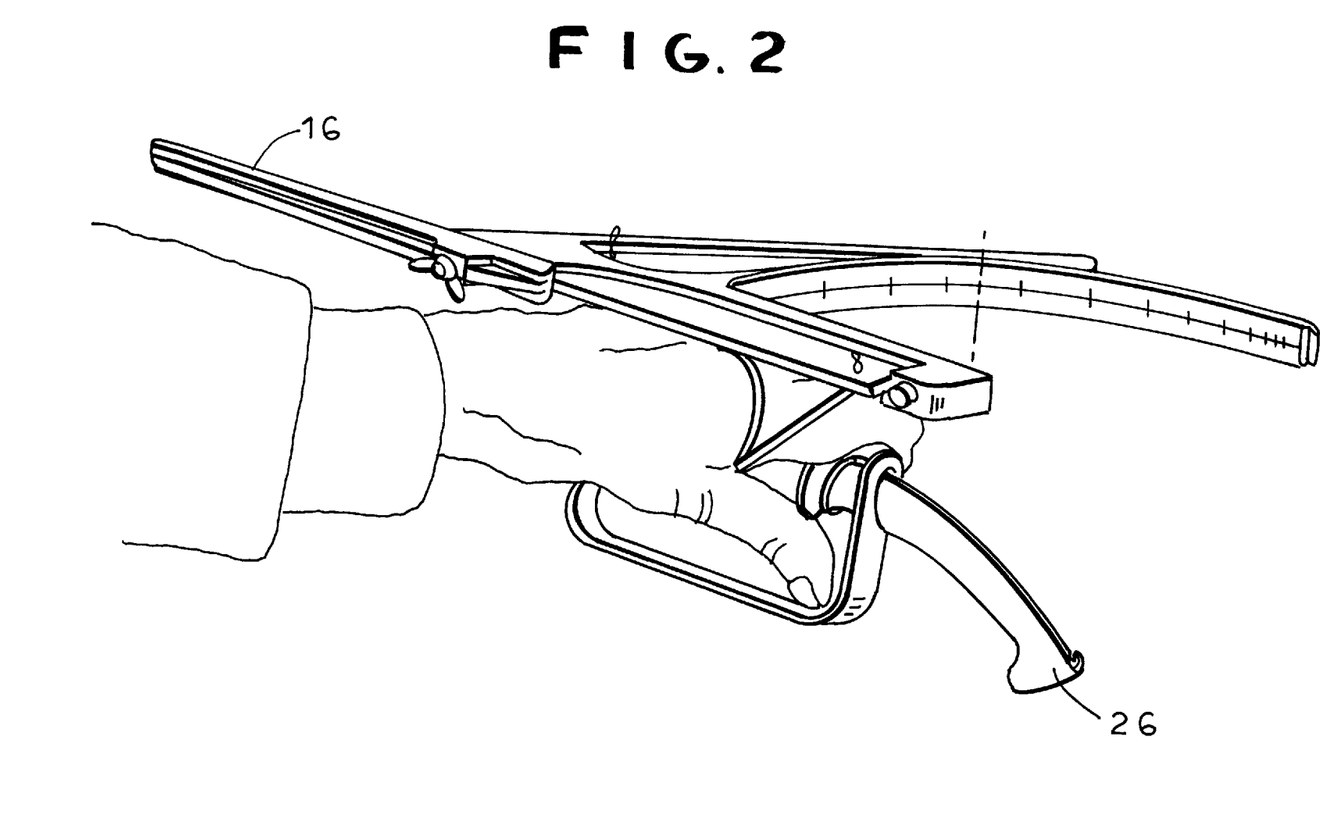
FIG. 2 is a view similar to FIG. 1 showing the gauge on a handle and with its arm extended.
Figure 12:
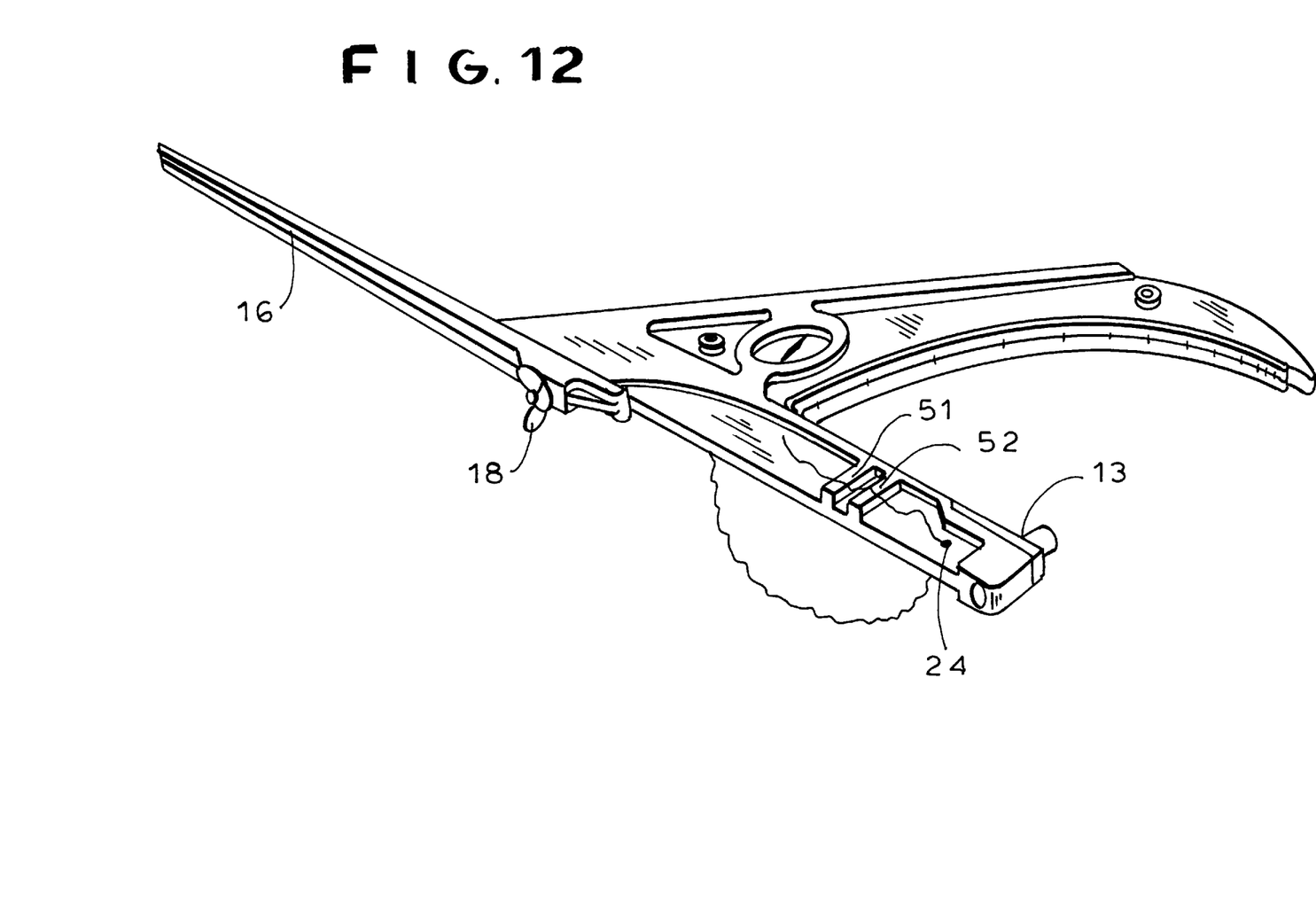
FIG. 12 is a perspective view showing how the gate can be supported by the rubber band on the back of the hand of a user in taking diameter measurements.

Basically the gauge of the present invention comprises a primary gauge member 10 in the form of a fixed angle having a first shank 11, a second shank 12 angularly adjoining the first shank, a means represented at 13, for example in FIG. 12, at the free end of the second shank 12 remote from the vertex 14 thereof for cooperating with an arcuate scale 15 along the inner side of the shank 11, and an arm 16 which is pivotable about a screw 17 when a butterfly nut 18 is loosened to enable that arm to swing into its extended position as shown in FIG. 2 where the arm 16 extends along the shank 12.

Figure 2A:
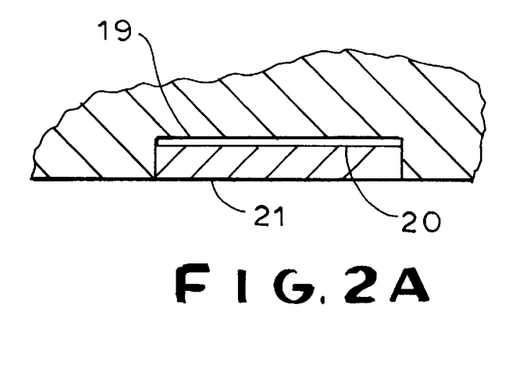
FIG. 2A is a detail section.

As can be seen in FIG. 2A, the underside of the fixed angle, preferably along the shank 11, may be provided with a recess 19 in which a layer of adhesive 20 can bond a hook and loop fastener 21 to enable attachment of the device, e.g. to a handle arrangement when a rubber band as described below is not used to support the gauge of FIGS. 1 and 2 on the back of the hand of a user.

Figure 3:
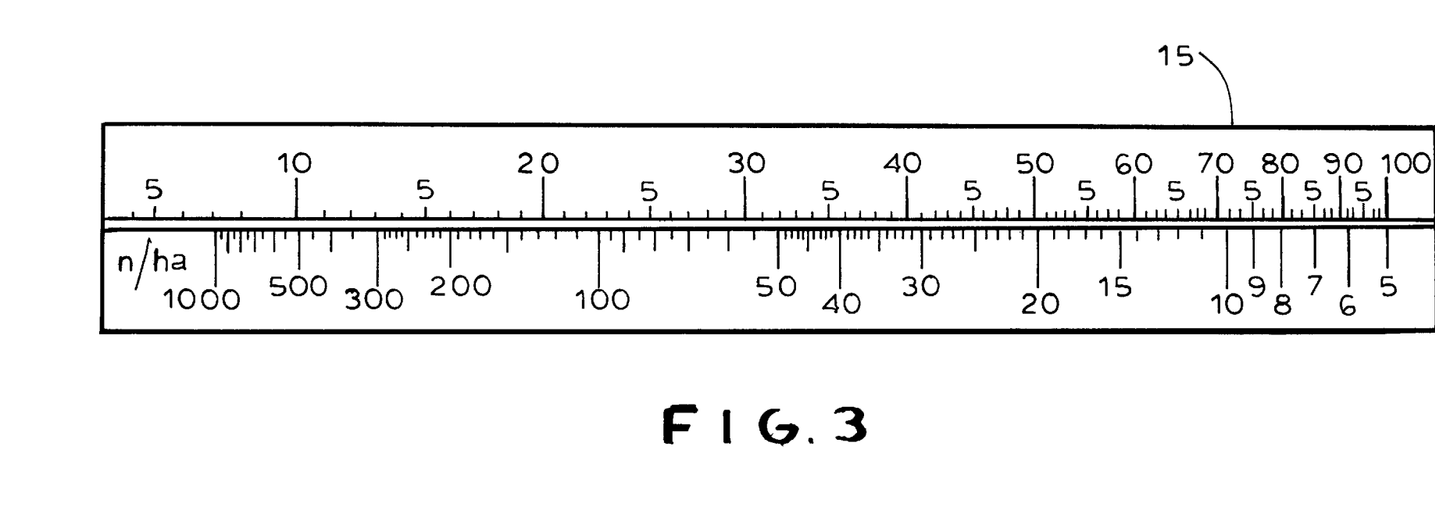
FIG. 3 is an elevational view showing the scales on the gauge.

The scale 15 has been shown in FIG. 3 and comprises two scales one above the other, the upper scale representing the diameter of a tree in centimeters or inches.

As can be seen from FIG. 1, the device 13 can be a viewing pin or needle which can be rotated into an upstanding position from a position in which it lies along the shank 12.

The unit 10 can be three holes represented at 22, 23 and 24, for example, the holes 22 and 24 receiving an elastic band through which the hand can be inserted. The holes 22 and 23 can, as will be apparent, receive gauge attachment devices which hold a member 30 on the member 10 when the gauge is to be used for measuring the diameter of trees of twice the diameter for which the gauge 10 is designed.

Figure 4:
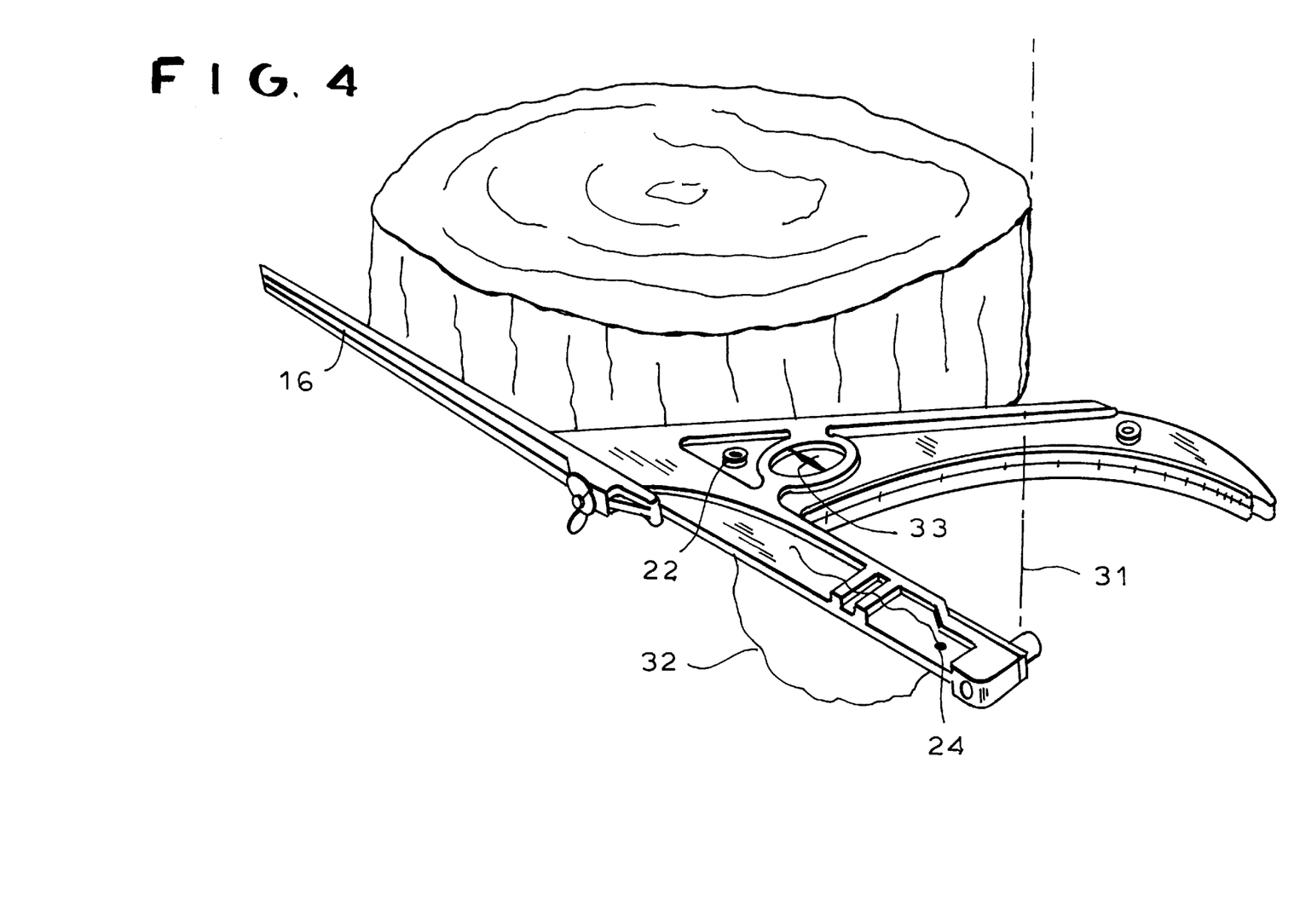
FIG. 4 is a perspective view diagrammatically illustrating the use of a gauge similar to that of FIG. 1 but wherein the line of sight from the pin has been shown.
Figure 5:
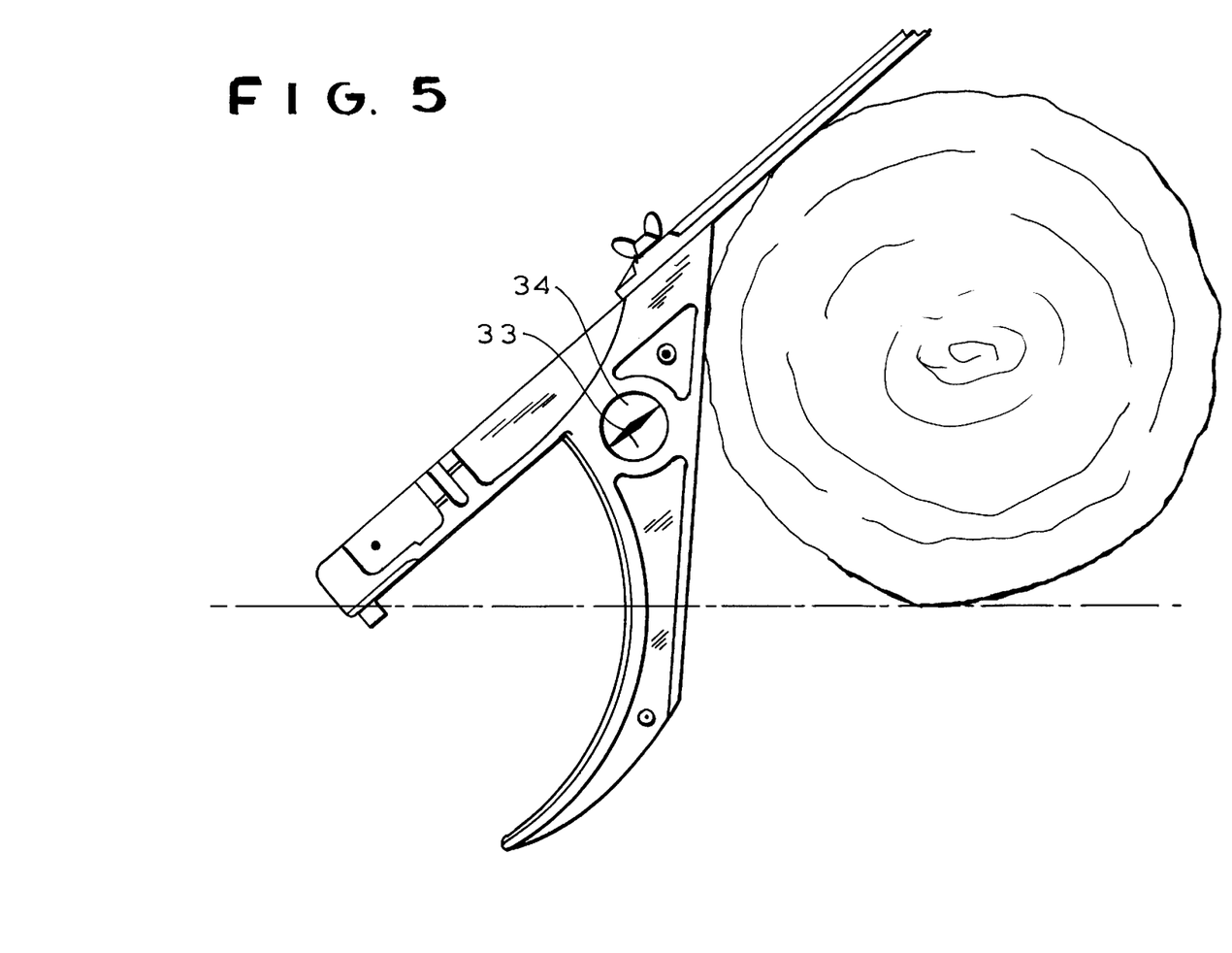
FIG. 5 is a plan view showing the use of the gauge of FIG. 4 in determining the diameter of a tree.

Further details of the gauge 10 can be seen in FIG. 4 in which the line of sight of the needle 13 cooperating with the scale 15 is shown as a line 31. The rubber band 32 passing through the holes 22 and 24 is here also visible. In FIGS. 4 and 5, moreover, we have shown a compass 33 in the shank 11, enabling the arm 16 to be aligned with the north, south, east or west axes as desired. In FIG. 5, the arm 16 is parallel to the needle 34 of the compass 33 directed to north.

In the compact state of the gauge of FIG. 1, wherein the arm 16 is disposed along the shank 12, the dimensions of the gauge are about 27×19×2 cm and its weight can be about 130 g. It is composed of shape-retentive and weather-resistant synthetic resin. The viewing needle 13 has been shown to be erect in FIGS. 1 and 2, although usually in the closed or compact state of the gauge, that needle will lie along the shank 12. In FIG. 1, knots of the rubber band 32 can be seen above the holes 22 and 24 to prevent the rubber band from being pulled out.

The region in which the holes are located can be recessed both above and below the gauge each by one-third of the thickness thereof an can form the recess 20 previously described in which a hook and loop fastener is received.

In FIG. 2, the rubber band can hold the gauge on the left hand of the user so that the gauge need not be held on a handle, but rather the hand can also grip the handle 25 of a scraper or marking tool 26. When a marking tool is not gripped by the user, the free fingers of the same hand that supports the gauge can be used to input data into an electronic calculator. For better attachment on the back of the hand, a strap of the hook and loop fastener passing around the hand can engage the portion 21 of the hook and loop fastener shown in FIG. 2A.

The projection of the viewing needle 13 upon the scale 15 can provide a reading on the upper scale of the trunk diameter of a tree between 4 and 100 cm or 2 and 40 inches. The lower scale gives the number of trees per hectare (n/ha) or per acre using Relaskop® factor 4 $m^2$/ha (or 20 sq. ft/acre) in a tree selection.

When the attachment 30 is used for tree trunks of double diameter (FIG. 5), the reading on the upper scale is doubled while that on the lower scale is a quarter in the case of the Relaskop® selection.

Figure 9:
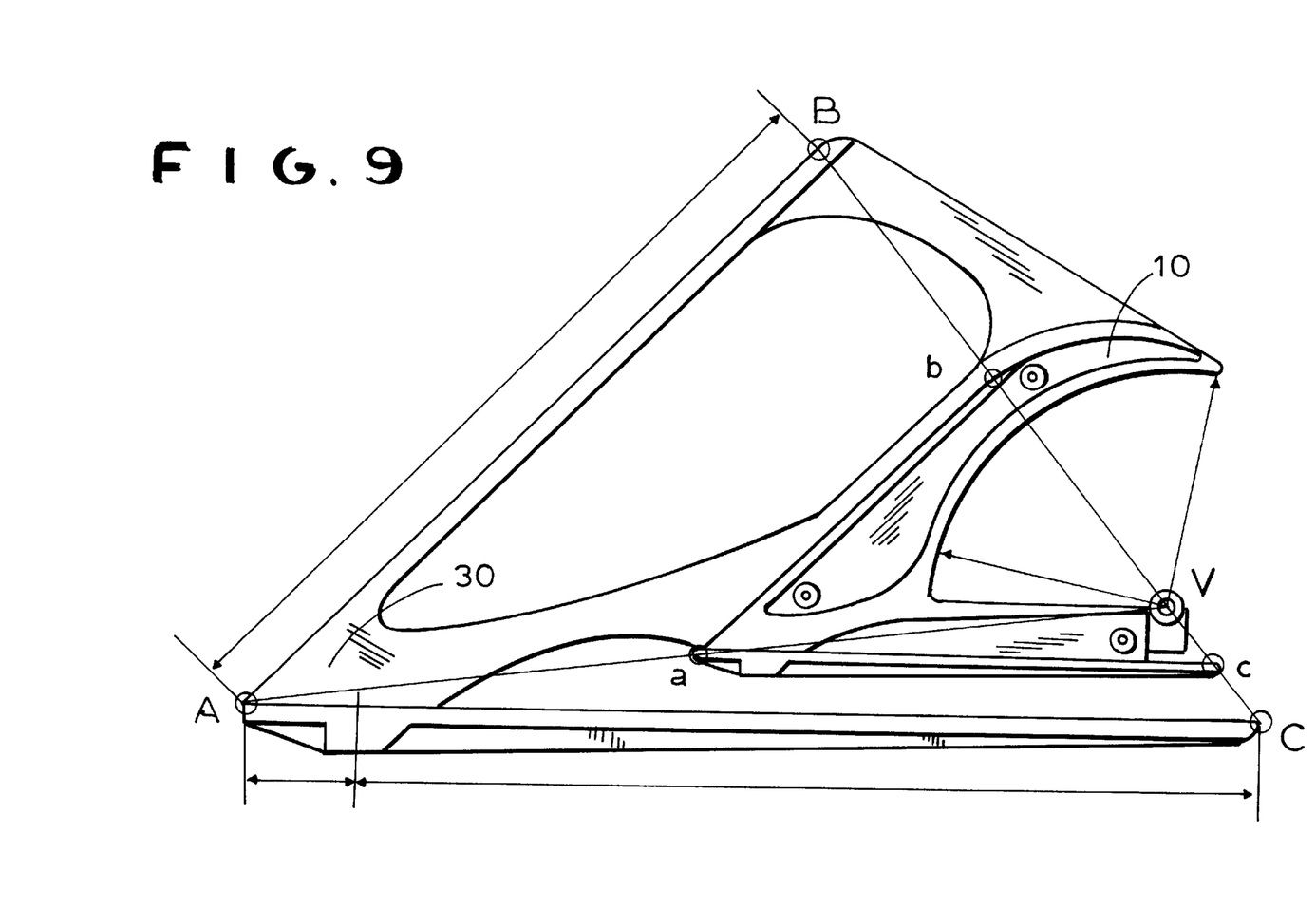
FIG. 9 is a diagrammatic plan view illustrating the principles of the attachment.

FIG. 9 clarifies the geometry and also the configuration of the attachment for doubled trunk diameter: the viewing needle is located at V, a centrum for central projections of the points a, b and c of the gauge 10 and the points A, B and C at twice the distance for the attachment.

As can be seen from FIG. 9, practically all of the significant dimensions of the gauge are doubled and thus the diameter reading of the scale which is unchanged must be doubled. However, since the cross sectional area is multiplied by a factor of four with doubling of the diameter, the value to be read from the lower n/ha scale is only one-quarter with a counting factor of 4 $m^2$/ha (or 20 sqft/acre) or one-eighth with a counting factor of 2 $m^2$/ha (or 10 sq. ft/acre). The tree trunk considered in a given hectare must be provided in a sufficiently large number that their individual cross sections is treated in meters square in the counting factor.

The attachment can be connected at the holes 2, 3 along the line a-b.

Figure 6:
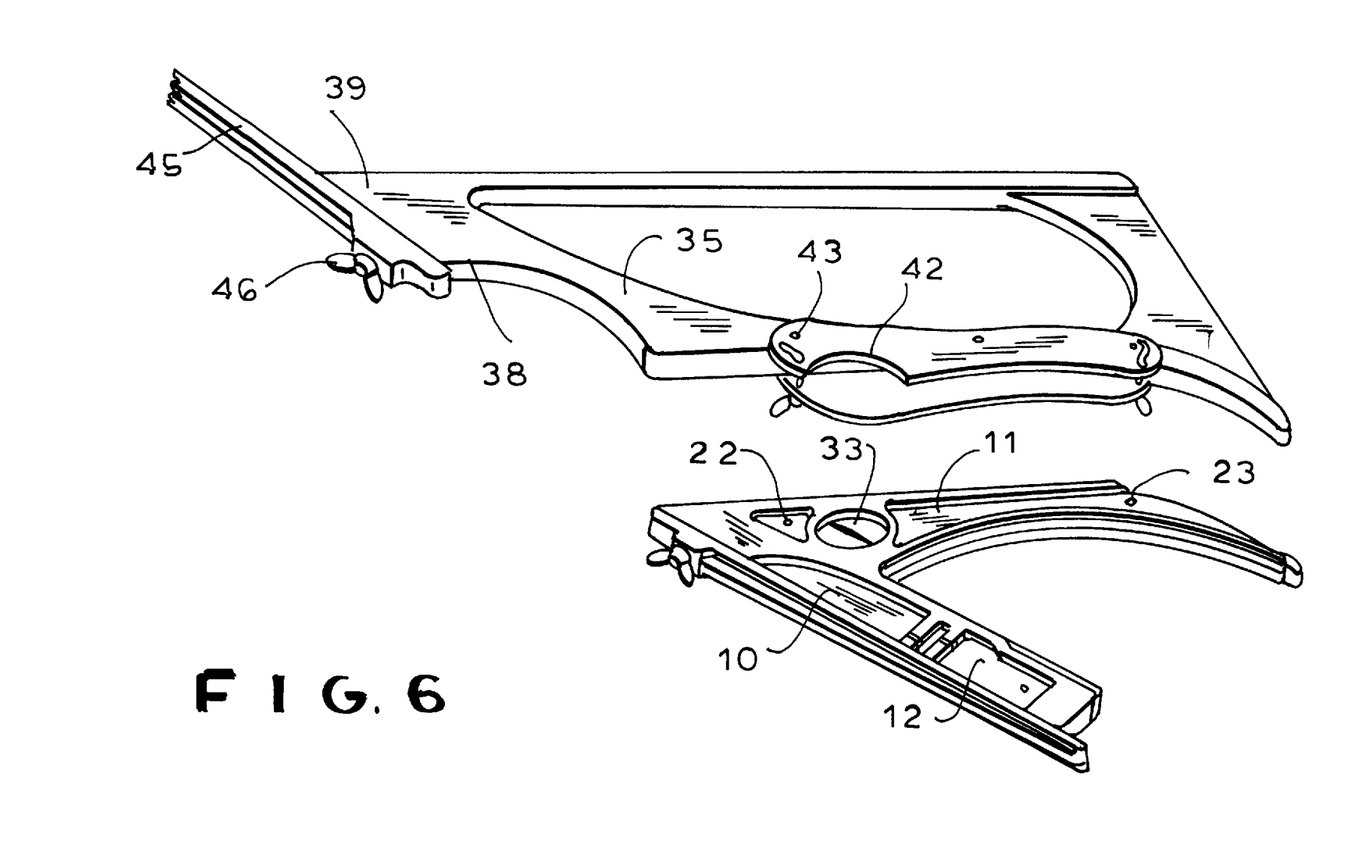
FIG. 6 is a diagrammatic perspective view showing the attachment separated from the gauge of FIGS. 1–5 and which can be connected therewith to allow the gauge to be used with trees of twice the diameter.

As can be seen from FIG. 6, the attachment 30 can have a narrow portion 35 bordered by an opening 36 to serve as a handle when the holes 22 and 23 serve to connect the attachment 30 to the gauge 10. More specifically the attachment 10 is also an angle with a first arm 37 and a second arm 38 joining at a vertex 39, but without an arcuate scale 15 as has been described in connection with the gauge 10. Here, however, the arm 38 adjoins a connector 40 which has a receptacle 41 receiving the arm 11 and provided with a cut-out 42 through which the compass 33 can be viewed. When the arm 11 is inserted into the receptacle 41, the holes 22 and 23 align with holes in the receptacle 41 and are traversed by pins 43 and 44 to lock the attachment 30 to the gauge 10. In FIG. 6, the arm 45 is shown to be swung into its open position about a bolt provided with a wing-nut 46.

Figure 7:
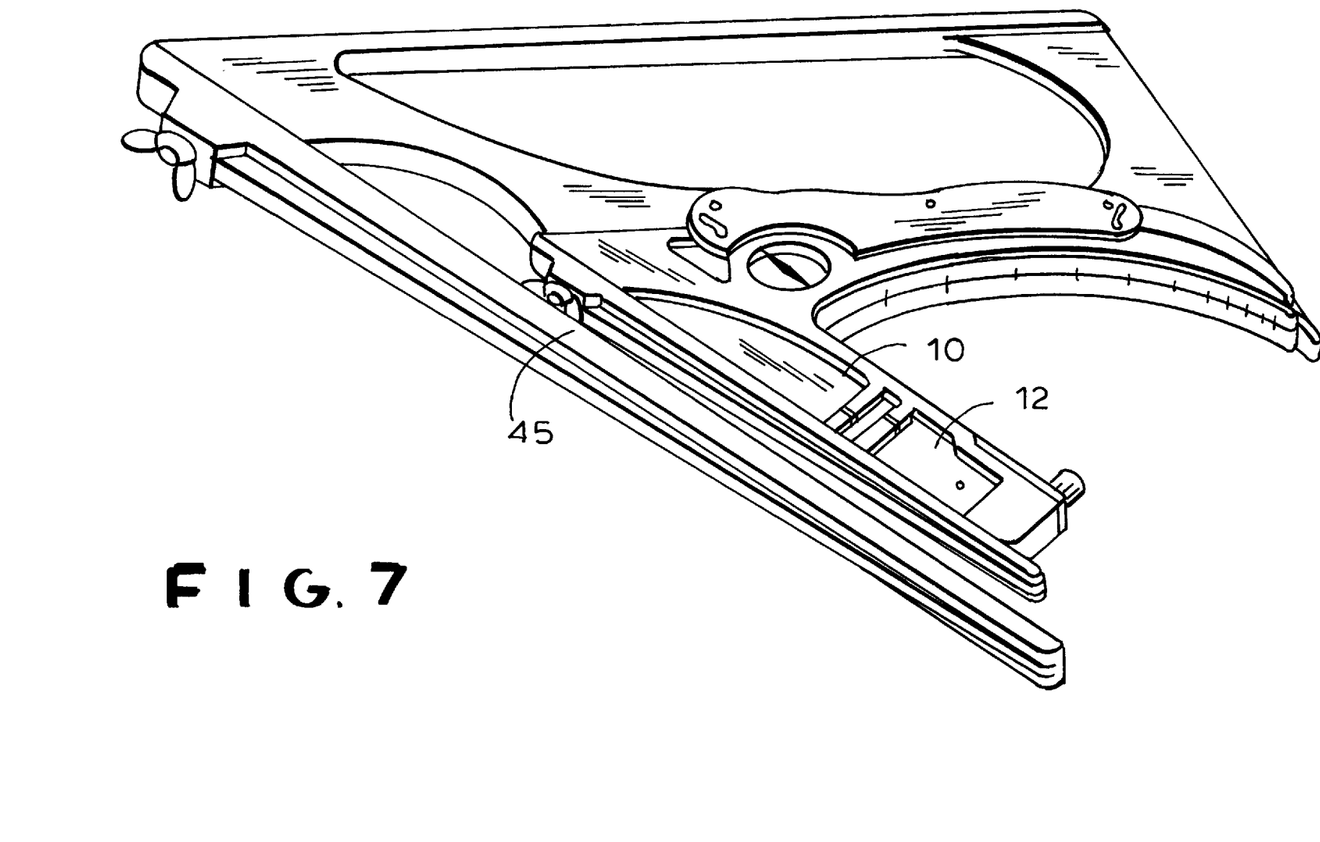
FIG. 7 is a view similar to FIG. 6 showing the assembled gauge but with its arm folded.

The closed position of the device is shown in FIG. 7 where the arm 45 lies along the arms 38 and 12.

Figure 8:
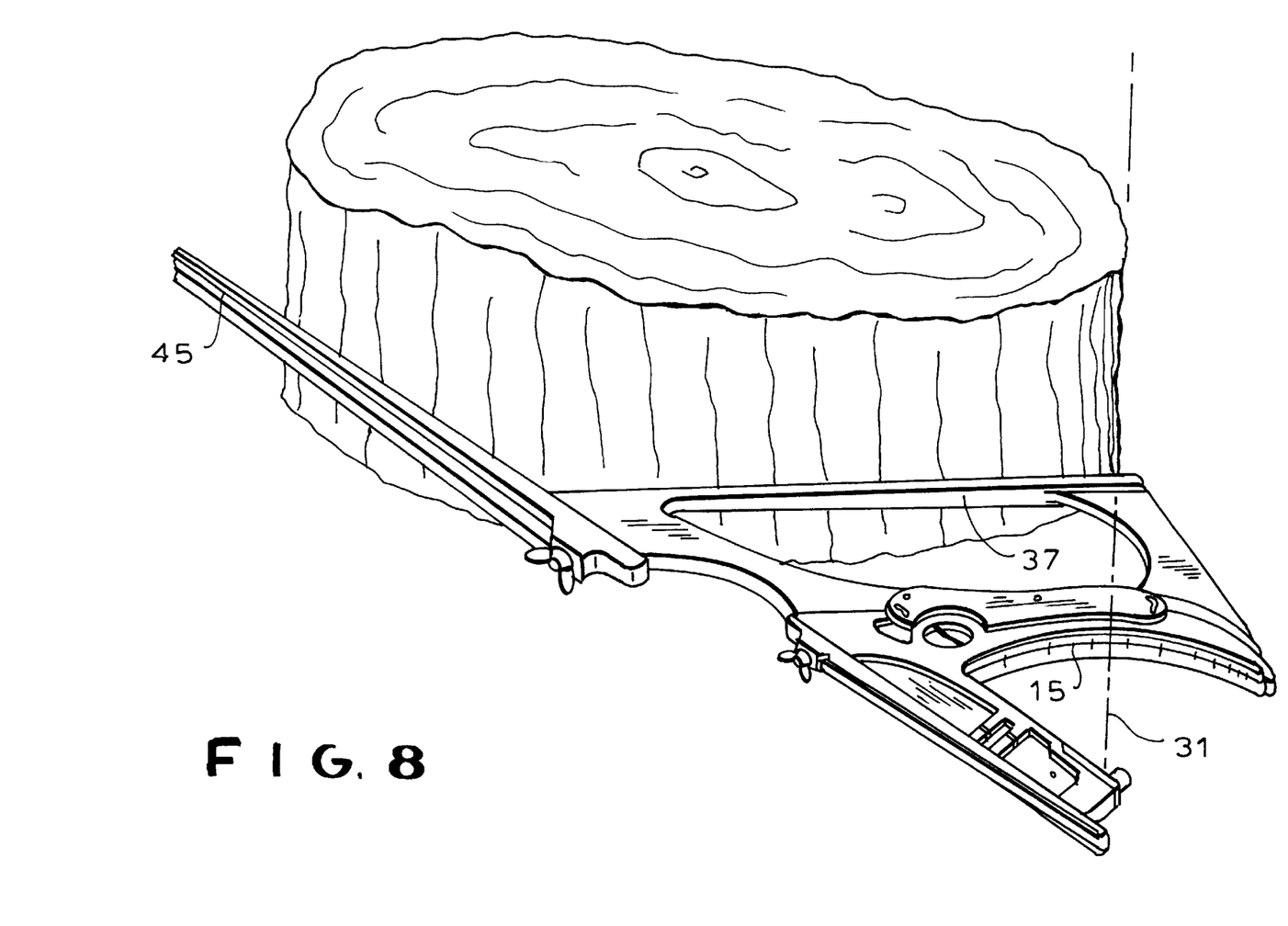
FIG. 8 is a view similar to FIG. 4 but illustrating the gauge with its attachment of FIGS. 6 and 7 in use for measuring the diameter of a tree.

In use, with the extended arm 45, the device is brought to lie against the trunk of a tree (FIG. 8), bearing upon the arm 45 and the arm 37, in such a way that the needle 13 (sighting pin) lines up with or is parallel to the right side of the tree trunk. The reading is taken on the upper scale 15. The value thus read is doubled to provide the diameter of the trunk of the tree.

Of course, when smaller diameter trees are to be measured, the attachment 30 can be removed by simply pulling up the pins 43 and 44 and the gauge 10 can then be used directly to measure a trunk of the tree as shown in FIGS. 12–15. The device is placed on the back of the hand (FIG. 12) which can pass through the loop of the rubber band. The arm 16 is swung outwardly and the thumb-screw 68 is tightened, utilizing the pin 13, a reading is taken as has been shown in FIG. 13 along the scale. The provision of the compass directly within the gauge allows orientation of the gauge with respect to the compass directions, i.e. the arm 18 in the north-south direction.

As can be seen from FIG. 12, while the rubber band in the case of FIGS. 1 and 2 is knotted in the holes 22, 24 to retain the band, a knot is provided at 50 in the device of FIG. 12 while the other end of the rubber band is held in place adjustably under two clamping bars 51, 52 on the upper side of the gauge. The clamping bars prevent withdrawal of the rubber band from the opening 24. The measurement of the diameter is obtained from the points $A_1$, $A_2$, $A_3$ in FIG. 2, representing the contact points along a sector angle which has been designated at σ is spanned between the three contact points $A_1$, $A_2$, $A_3$. The sector angle depends upon the chest-high diameter of the trunk of the tree to be measured and amounts at a BHD of 30 cm to 131°, a BHD of 60 cm to 102° and a BHD at 90 cm to 87°. With a BHD of about 83 cm, the measured angle is practically exactly a right angle.

Figures 13, 14, 15:
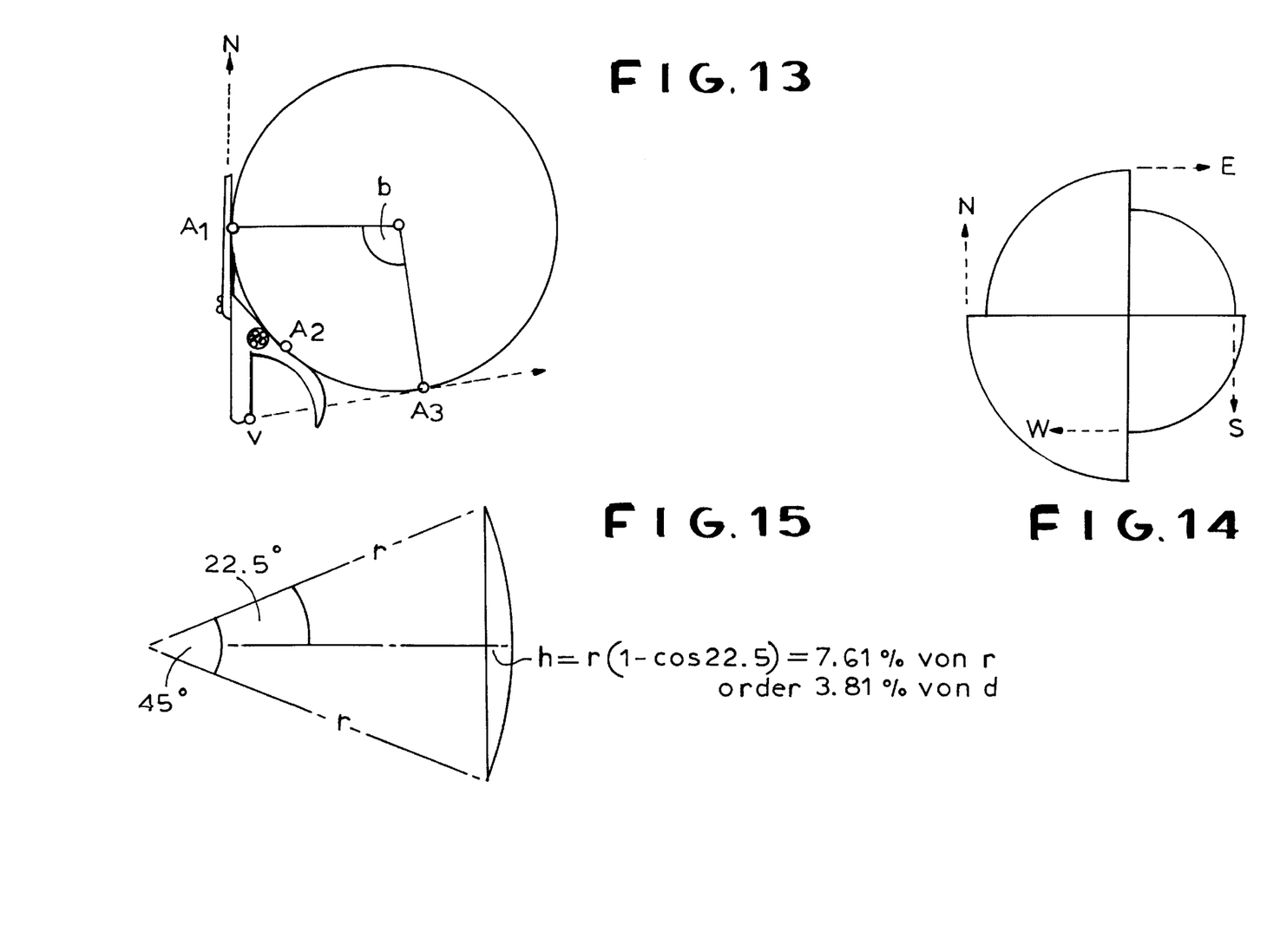
FIG. 13 is a diagram illustrating the principles of use of the gauge.
FIGS. 14 and 15 are additional diagrams illustrating these principles.

Reference can be made to FIG. 14 which shows that with the aid of the compass, measurements can be made in four directions each 90° offset from one another on a trunk which deviates from the circular. The results yield four diameters, each of which is assumed to cover a quarter of the cross section and can be added. From the total area, an average circular diameter can be calculated.

FIG. 15 shows that for each of the 16 contact points corresponding to a succession of equispaced measurements taken about a tree, there is a simple relationship between the segment height h and the radius r or the diameter 2R. The calculation can be made by a relatively simple computer program. To enable the compass to be observed during the measurement from all positions, a small mirror may be mounted on the gauge to allow viewing of the compass.

Figure 10:
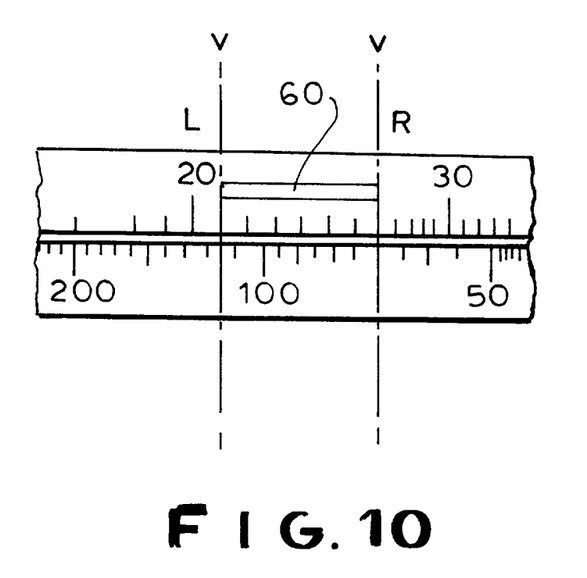
FIG. 10 is an elevational view representing a modification of a portion of the scales of the gauge when the gauge is additionally to be used as a substitute for a Relaskop® tree-measuring instrument capable of additional forestry measurements apart from that of local tree diameter.
Figure 11:
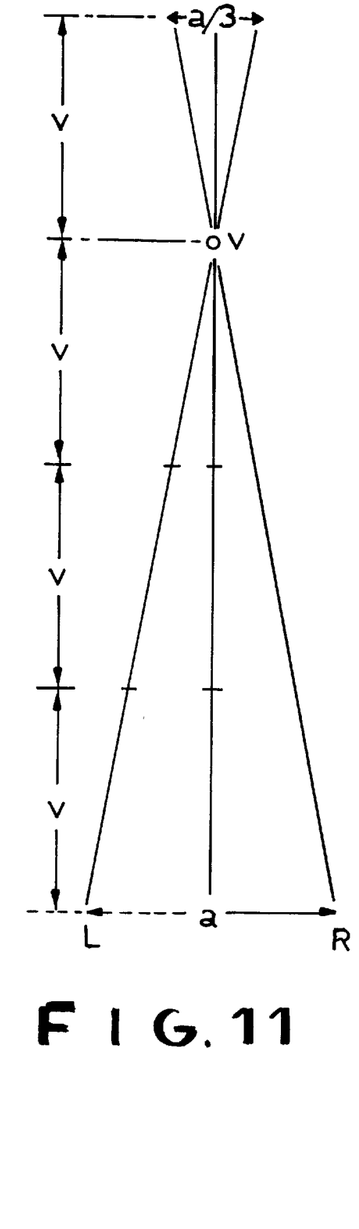
FIG. 11 is a diagram showing the use of the modified scale of FIG. 10.

FIGS. 10 and 11 show that the gauge of the invention can be used, apart from its main function as a measuring device for trunk diameter at chest height, also for angle count sampling as has been described. The upper scale here is provided with a band 60 (FIGS. 10 and 11) which has two boundaries V, V, spaced apart by a third of the inter-eye spacing a, i.e. a third of the center-to-center distance between the eyes represented at R and L in FIG. 11.

When this distance relationship is followed, using a spacing from the needle V from the scale surface of v, the detection of separate images by the right and left eyes of the regions V bounding this strip 60 will correspond to a given span in which a count can be effected in a manner analogous to that obtainable with a Relaskop®. More particularly, the eye spacing of the individual is used for obtaining a desired eye distance from one or more width marks on the scale surface. When the individual eye spacing a coincides with the double image of the needle V at the limits V of the band shown at 60, the eye is at a distance 3v from the needle V which, as noted, is spaced by V from the scale surface. The eye distance from the scale is thus 4v. At this distance an accurate count can be made which is reproducible by eye and without other equipment.

We claim:

1. A tree-trunk-diameter gauge comprising:

a rigid angle body formed with a first shank and a second shank adjoining said first shank at a vertex of said body;

an arm pivotably mounted on said second shank proximal to said vertex between a compact position wherein said arm lies along said second shank and a working position wherein said arm extends from said vertex, whereby said arm and said first shank engage spaced apart locations on a tree trunk;

an arcuate scale on an inner side of said first shank convexly facing toward an end of said second shank remote from said vertex;

means at said end cooperating with said scale and positionable in line with a side of the tree trunk for indicating on said scale a diameter of said tree trunk; and an attachment connectable with said body and dimensioned to contact tree trunks of larger trees while enabling said indicator means to indicate the diameters thereof on said scale upon application of a multiplication factor.

2. The tree-trunk-diameter gauge defined in claim 1 wherein said first shank has a pair of spaced apart holes and said attachment has connectors releasably engageable in said holes.

3. The tree-trunk-diameter gauge defined in claim 2 wherein one of said holes is located at said vertex, said second shank having a further hole spaced from said one of said holes, said gauge further comprising an elastic band extending through said one of said holes and said further hole for securing the gauge on a back of a hand of a user.

4. The tree-trunk-diameter gauge defined in claim 2 wherein said body has, upon an underside thereof, a recess in which a hook-and-loop fastener is adhesively secured for securing said gauge on a back of a hand of a user.

5. The tree-trunk-diameter gauge defined in claim 1 wherein said attachment comprises a further rigid angle body formed with a respective first shank and a respective second shank adjoining said first shank of said further body at a respective vertex thereof, and a further arm pivotably mounted on said second shank of said further body proximal to said vertex of said further body for swinging movement between a compact position wherein said further arm lies along said second shank of said further body and a working position wherein said further arm extends from said vertex of said further body, said further body having means for connecting said further body to said first shank of the first-mentioned body.

6. The tree-trunk-diameter gauge defined in claim 5 wherein corresponding points on said further body are twice the distance from said indicator means than respective points of said first-mentioned body and said multiplication factor is two.

7. The tree-trunk-diameter gauge defined in claim 5 wherein said indicator means is a pin for sighting across said scale to said side.

8. The tree-trunk-diameter gauge defined in claim 5, further comprising a magnetic compass on one of said bodies for orienting said gauge in space.

9. The tree-trunk-diameter gauge defined in claim 8 wherein said compass is on said first-mentioned body.

10. The tree-trunk-diameter gauge defined in claim 9 wherein said means for connecting includes a member formed with a cutout through which said compass is visible.

11. The tree-trunk-diameter gauge defined in claim 1, further comprising a magnetic compass on said body for orienting said gauge in space.

12. The tree-trunk-diameter gauge defined in claim 1 wherein said scale has an upper scale row and a lower scale row, one of said scale rows displaying indicia of trunk diameter, the other scale row displaying indicia of number of trees per unit of land area.

13. The tree-trunk-diameter gauge defined in claim 1, further comprising a band on one of said scales of a width corresponding to an individual spacing of centers of eyes of a user for establishing a given distance of the user's eyes from the gauge.

* * * * *